Patented Mar. 26, 1940

2,195,248

UNITED STATES PATENT OFFICE 2,195,248

PLASTIC AND METHOD OF PRODUCING SAME

Robert C. Hills and Maxwell M. Barnett, Port Sulphur, La.

No Drawing. Application November 1, 1937, Serial No. 172,272

1 Claim. (Cl. 260—37)

This invention relates to that class of compositions known as plastics.

Sulphur in its normal process of cooling from the molten form crystallizes into a brittle mass of little or no strength. In this form it not only lacks strength and plasticity but also adherence and other properties desirable in plastics, and because of the lack of these properties, it cannot be used for the purposes for which plastics are commonly used.

Various methods of making plastic sulphur have been devised but have not been successfully or extensively used either because of the expense involved in making plastic sulphur, or because of undesirable properties of the resulting plastics.

This invention has for its general object the provision of a new and improved method whereby a good plastic sulphur may be inexpensively produced.

A specific object of the invention is to provide a new and improved method for inhibiting the crystallization of sulphur to produce an inexpensive plastic having many desirable properties hereinafter referred to.

Other objects and advantages of the composition and process of producing the same contemplated by this invention will become apparent from the following description which is given by way of illustration and example and not by way of limitation.

This invention consists in general of the formation of a plastic sulphur by mixing with sulphur a suitable proportion of an aldehyde-polysulphide resin. We have discovered that the resins formed by the condensation of aldehydes with polysulphides are soluble in molten sulphur in all proportions and that the presence of these resins in sulphur serves to inhibit crystallization more completely than any previously known method. These resins also are in many cases relatively inexpensive and by comparison a relatively small quantity of the resin is necessary to produce the desired degree of plasticity. The degree of plasticity obtainable is substantially directly proportional to the amount of resin employed and the resultant product is substantially odorless and free from discoloration.

The product resulting from this process, aside from the qualities just mentioned, is very tough, has a strength far beyond that of any previously known plastic sulphur, possesses excellent molding and adhesive qualities, and is exceedingly resistant to chemical attack so that it is suitable for lining acid vats, etc.

It is to be understood that the aldehyde-polysulphide resins which are contemplated by this application include those produced by the interaction of the polysulphides of the alkaline earths, the alkali metals, ammonia or organic bases with aldehydes, aldehyde derivatives or aldehyde polymers. Examples of the aldehydes which may be employed are formaldehyde and benzaldehyde. An example of the aldehyde derivatives contemplated is hexamethylene tetramine. An example of aldehyde polymers is paraformaldehyde.

For the purposes of the claims in this application, the term aldehyde will be understood to include not only the true aldehydes, but also the aldehyde derivatives, and the aldehyde polymers. Where the term is intended to be limited to true aldehydes, the word "true" will precede the word "aldehyde".

In like manner, the word "polysulphide" wherever used without modification shall be understood to include polysulphides of the alkaline earth group, polysulphides of the alkali metal group, polysulphides of ammonia and polysulphides of the organic bases.

By way of more specific example, one desirable form of plastic sulphur may be produced by heating 80 grams of sulphur to any point above its melting point, but preferably not exceeding 160° C., and adding to this molten sulphur 20 grams of an aldehyde-polysulphide resin, this resin being prepared by the condensation of formaldehyde with sodium pentasulphide. The resulting mixture is stirred until the resin goes into a solution in the sulphur, the temperature range referred to being maintained during the mixing process. The mixture will then be allowed to cool and may be used in the manner in which plastics are ordinarily employed.

Another specific resin which can be employed with great advantage is one obtained by the condensation of formaldehyde with sodium tri-sulphide ($Na_2S_3$).

Specifically, the preparation of this resin may be as follows: A solution of sodium trisulphide is prepared by dissolving 165 grams of sodium sulphide and 135 grams of sulphur in 500 cc. of water. The resulting solution is heated to 90° C. and to it is slowly added 500 cc. of a 37 per cent formaldehyde solution. The resin is obtained as a granular precipitate, which is filtered off, washed and dried, producing a white amorphous powder.

The preparation of this resin, as well as the resin per se, are being claimed in a separate co-pending application, S. N. 170,624, filed October 23, 1937.

Another superior resin for use in producing the plastic sulphur contemplated by this invention, is one formed by the treatment of aldehyde-polysulphide resins with a condensing agent such as sulphuric acid, sodium hydroxide, ammonia, zinc chloride or stannic chloride in a liquid medium. This treated product is a superior type of resin and produces superior results when mixed with sulphur to form a plastic in accordance with this invention. The treatment of aldehyde-polysulphide resins to produce the resin just referred to is also being claimed in a separate co-pending application.

The plastic sulphur produced by the process above described may be utilized by mixing with sand or other suitable fillers for the production of a cement or plaster, cements or plasters so produced being exceedingly strong and highly resistant to chemical attack. This is especially true when the resins used as the plasticizing agent have been first subjected to the condensation process with condensing agents such as sulphuric acid, sodium hydroxide, ammonia or the like.

When the cement is formed of a mixture of sand, sulphur, and the resin formed by the condensation of sodium trisulphide and formaldehyde in approximately the proportion of 50% sand, 40% sulphur, and 10% of the resin referred to, the cement exhibits astonishing properties of strength, such a cement having a tensile strength in the neighborhood of 1000 lbs. per square inch.

Various uses to which the cheap plastic sulphur provided by this invention may be put will be readily apparent to those skilled in the art. For example, cheap plastic sulphur is useful as a binder for wood waste or other woody material to make wall boards with excellent insulating and sound-proofing properties. It is useful as a binder for roads, walks, tennis courts and the like. It may be used to impregnate paper products to make them water and oilproof. It may be found useful as a substitute for asphaltic material and the fabrication of high grade roofs and the like. It will serve as an adhesive for metal surfaces. It can be used as a substitute for rubber where the article has to come in contact with corrosive liquids or hydrocarbons.

By the foregoing, it will be seen that a sulphur plastic and method of producing the same has been provided whereby all of the objects sought by this invention may be realized.

Having described our invention, we claim:

A composition of matter in the nature of a cement comprising 50% sand, 40% sulphur, and 10% of a resin obtained in the form of a granular precipitate by dissolving an alkali metal sulphide and sulphur in 500 c. c. of water, heating the resulting solution to 90° C. and reacting therewith 500 c. c. of a 37% formaldehyde solution, the resin being melted into the sulphur which has been heated to a point not exceeding 160° C., said composition of matter being highly resistant to chemical attack and having a tensile strength in the neighborhood of 1000 pounds per square inch.

ROBERT C. HILLS.
MAXWELL M. BARNETT.